United States Patent [19]

Harbison et al.

[11] 4,445,249
[45] May 1, 1984

[54] ROCK-TO-LOCK CONNECTION ARM-TO-BLADE

[75] Inventors: William H. Harbison; Michael G. Mohnach, both of Valparaiso, Ind.

[73] Assignee: The Anderson Company of Indiana, Gary, Ind.

[21] Appl. No.: 363,554

[22] Filed: Mar. 30, 1982

[51] Int. Cl.³ ............................................... B60S 1/40
[52] U.S. Cl. ................................................. 15/250.32
[58] Field of Search ........... 15/250.32, 250.34, 250.42, 15/250.35

[56] References Cited

U.S. PATENT DOCUMENTS

| | | |
|---|---|---|
| 2,127,142 | 8/1938 | Rodrick . |
| 2,156,506 | 5/1939 | Marcolivio . |
| 2,160,246 | 5/1939 | Zaiger . |
| 2,172,928 | 9/1939 | Anderson . |
| 2,443,113 | 6/1948 | Nesson . |
| 3,576,044 | 4/1971 | Besnard . |
| 4,240,177 | 12/1980 | Harbinson et al. ............. 15/250.32 |
| 4,293,974 | 10/1981 | Gowans et al. ................. 15/250.32 |

FOREIGN PATENT DOCUMENTS

| | | |
|---|---|---|
| 2331324 | 1/1974 | Fed. Rep. of Germany . |
| 2743086 | 9/1976 | Fed. Rep. of Germany . |
| 2742021 | 3/1979 | Fed. Rep. of Germany . |
| 2905562 | 8/1979 | Fed. Rep. of Germany . |
| 969187 | 5/1950 | France . |
| 1235573 | 5/1960 | France . |
| 2254959 | 7/1975 | France . |
| 2403246 | 4/1979 | France . |
| 2449564 | 10/1980 | France .............................. 15/250.32 |
| 615364 | 1/1948 | United Kingdom . |
| 786992 | 1/1957 | United Kingdom . |
| 2067068 | 7/1981 | United Kingdom ............. 15/250.32 |

Primary Examiner—Peter Feldman
Attorney, Agent, or Firm—Wood, Dalton, Phillips, Mason & Rowe

[57] ABSTRACT

Connector apparatus is provided for permitting rapid connection and disconnection of a wiper blade from a wiper arm. The blade portion of the connector includes a pair of spaced apart parallel slots. To accommodate different styles of wiper arm ends, two longitudinally spaced pins are provided on the blade. One of the two pins is used with an arm end having two parallel spaced tabs with forwardly facing pin slots and the other pin is used with an arm end having two parallel spaced tabs, forwardly facing pin slots and rearwardly spaced guide portions. Both of the last named two arm ends have structure for retaining the blade on the arm end even when the blade and arm are lifted from the windshield. In an additional embodiment, one of the two pins is removable to accommodate attachment of the side pin of a side pin style connector. Since the arm is secured to the blade along two transversely spaced planes, the chances of rollover of the blade relative to the arm is minimized.

30 Claims, 30 Drawing Figures

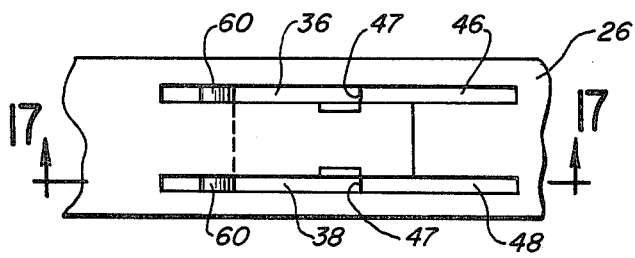
FIG. 16
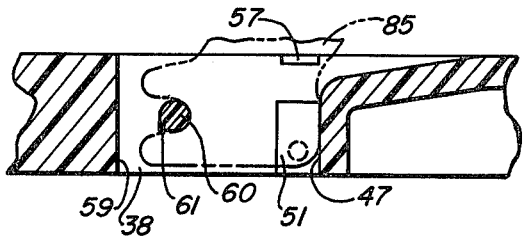
FIG. 17
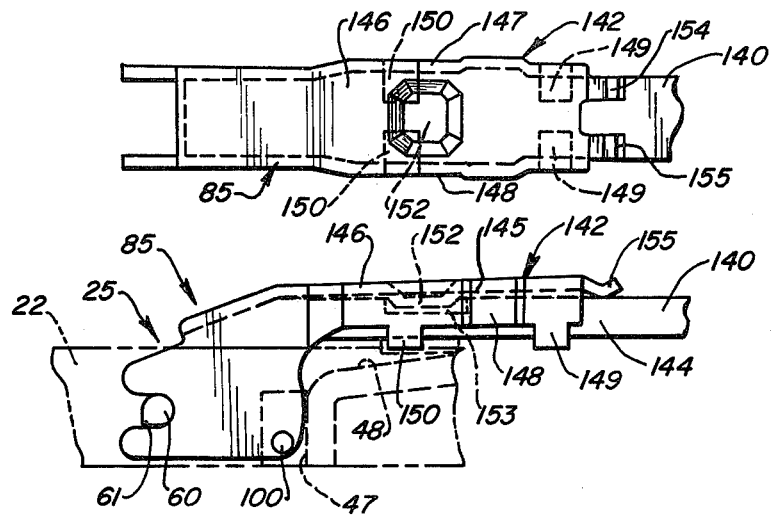
FIG. 18
FIG. 19
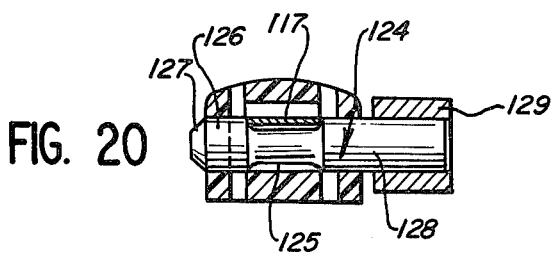
FIG. 20
FIG. 21
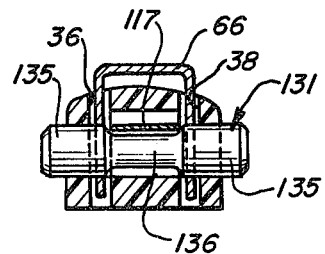
FIG. 22
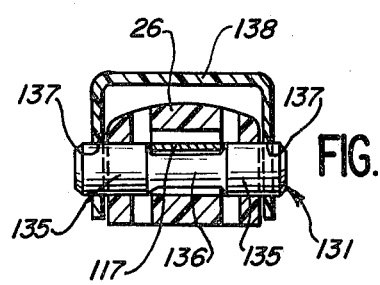
FIG. 23

ROCK-TO-LOCK CONNECTION ARM-TO-BLADE

DESCRIPTION

BACKGROUND OF THE INVENTION

This invention relates generally to windshield wiper assemblies, and in particular to an apparatus for facilitating assembly or disassembly of a wiper blade to one of various forms of wiper arms.

Various types of apparatus or connectors are currently in use for securing a windshield wiper blade to a wiper arm. One such type of apparatus is known as the pin-type connector wherein a pin passes through apertures in the wiper arm and wiper blade and wherein the pin is restrained within the apertures by a spring clip or other form of restraining device.

Still other types of connectors on the end of a wiper arm are currently in use, such as the hook end or straight end types, so called because of the configuration of the end of the wiper arm which is attached to the wiper blade.

Most current connections between arms and blades have a tendency to permit rollover of the blade which can cause scratching of the windshield and, in particular, produce a poor wipe of the windshield.

SUMMARY OF THE INVENTION

According to the present invention, an apparatus for securing a wiper blade to a wiper arm includes first and second tabs having pin engaging means in the form of pin slots which engage a pin disposed transversely to a pair of longitudinally disposed, spaced apart slots formed in the primary yoke of the wiper blade. Bosses are disposed on the first and second tabs and are adapted to be received within recesses formed adjacent the slots of the wiper blade such that the blade is firmly secured to the arm yet a limited degree of rotational freedom of movement is provided in the plane transverse to the windshield.

The tabs may be disposed directly on the end of a wiper arm or may be disposed on the end of an adaptor which is in turn secured to one of several types of wiper arms, e.g. a straight end wiper arm.

The pin to which the pin slots on the arm engage is located within the primary yoke of the wiper blade, and hence is protected from the elements. Moreover, the blade engaging portion of the arm has a transverse spacing between the tabs or ears, with the spacing being advantageous in that it minimizes the rollover of the blade and increases the lateral stability while at the same time permitting rapid connection and disconnection of the blade from the arm.

The blade connector includes, in one dual pin type blade, two longitudinally spaced pins which span the spaced slots in the blade. One pin connects with an arm end of the type having pin slots and bosses and both pins being used with the type of arm end having pin slots, bosses and rearward spaced downwardly disposed stabilizing lugs with the second pin fitting between the tabs and lugs.

One of the pins in an alternate dual pin type blade is removably held on the blade by a spring member engaging in an undercut slot in the pin with the pin being removable by manipulating the spring member. Side pins of side pin type arm ends or side pin type connectors can be assembled with the blade by inserting the side pin in the pin hole.

BRIEF DESCRIPTION OF THE DRAWINGS

FIG. 16 is a plan view of another modified form of connector;

FIG. 17 is an elevational view of the windshield wiper arm connector of FIG. 16 with an arm end of the type illustrated in FIG. 10;

FIG. 18 is a plan view of an adaptor for connecting a straight end wiper arm to the connector of a wiper blade embodying the invention;

FIG. 19 is an elevational view of the adaptor and connector of FIG. 18;

FIG. 20 is a cross-sectional view taken along the line 20—20 of FIG. 11 only connected with a fixed side pin on an arm end;

FIG. 21 is a double ended pin that can be connected with the connector of FIG. 10 and with an arm having a spring connector on the end thereof;

FIG. 22 is a pin connected with the connector of FIGS. 10 and 11 with an arm end of the type shown in FIG. 13 connected therewith;

FIG. 23 is a pin connected with the connector of FIGS. 10 and 11 with an arm end straddling the outside of the connector;

DESCRIPTION OF THE PREFERRED EMBODIMENT

Figure 1:
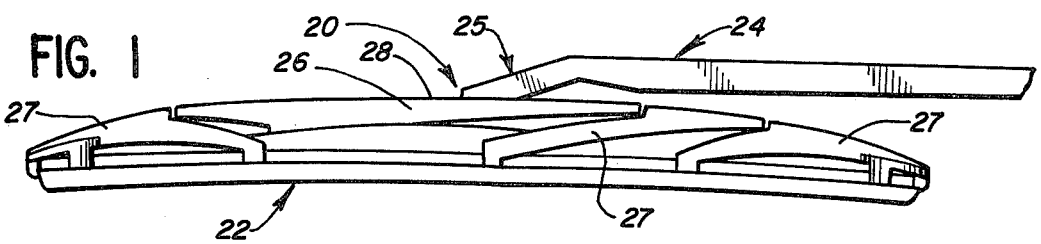
FIG. 1 is an elevational view of a windshield wiper assembly incorporating a connector or a connection apparatus embodying the present invention.
Figure 2:
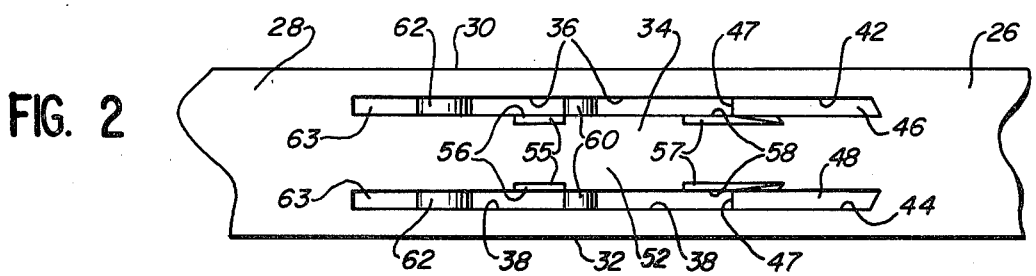
FIG. 2 is a plan view of the connector portion of the primary yoke of the wiper blade shown in FIG. 1.

Referring to FIG. 1, there is illustrated a wiper assembly 20 consisting of a wiper blade 22 disposed on the end of a wiper arm 24. The wiper blade 22 is secured to the wiper arm 24 by means of a connector, illustrated generally at 25, embodying one preferred form of the present invention.

Referring specifically to plural FIGS. 2-9, the wiper blade 22 includes a primary yoke 26 and plural secondary yokes 27 with the primary yoke 26 having a top wall 28 and side walls 30,32.

The primary yoke 26 has a female portion 34 of the connector 26 which includes a pair of slots 36,38 formed in the top wall 28 and extending all the way through the primary yoke 26 to a bottom wall 40 thereof. A pair of tapered slots 42,44, seen in FIG. 3, are contiguous with the slots 36,38, respectively, and include sloped lead-in surfaces 46,48 for the respective slots.

The slot 36 and its lead-in tapered slot 42 are parallel to, and separated by a predetermined distance from, the slot 38 and its lead-in tapered slot 44.

Figure 3:
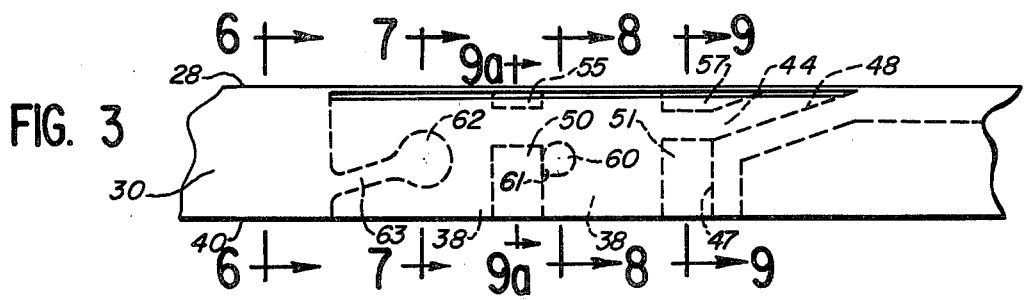
FIG. 3 is an elevational view of the connector portion of the primary yoke of FIG. 2 with various details shown in phantom.
Figure 5:
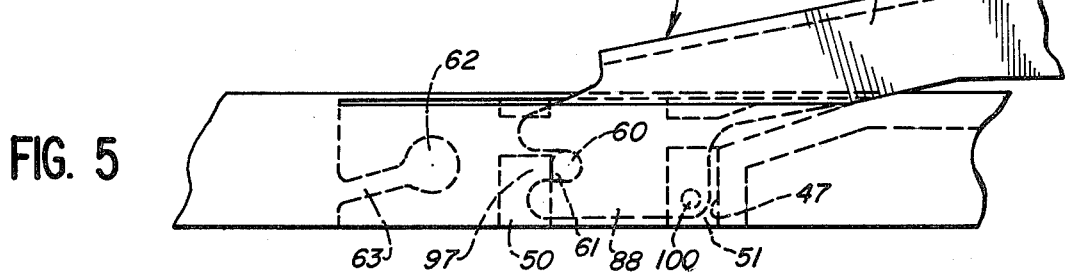
FIG. 5 is an elevational view of the connector portion of FIG. 3 with another type of windshield wiper arm end shown in phantom and connected therewith.
Figures 6, 7, 8, 9, 9A:
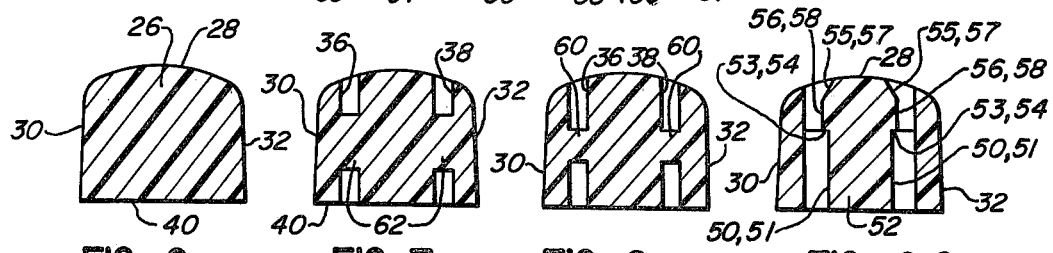
FIG. 6 is a sectional view taken along the line 6—6 of FIG. 3.
FIG. 7 is a sectional view taken along the line 7—7 of FIG. 3.
FIG. 8 is a sectional view taken along the line 8—8 of FIG. 3.
FIG. 9 and 9a are substantially identical and are sectional view taken along the lines 9—9 and 9a—9a, respectively of FIG. 3.

As seen in FIGS. 3, 5 and 9, two longitudinally spaced pairs of back to back recesses 50,50,51,51 are located adjacent to the slots 36,38 extending inwardly in a direction transverse to the side walls 30,32 and into a central portion 52 located between the slots 36,38. Each recess 50,50 and 51,51 are generally rectangular in shape. The pair of recesses 50,50 are outboard on the blade with respect to the pair of recesses 51,51. The recesses 50,50 are identical in shape to the recesses 51,51. The bases of the recesses 50,50 and 51,51 are spaced apart a distance less than the distance between the side faces of the central portion 52 to provide undercut surfaces defined by overhanging ledges 53,53 for recesses 50,50 and ledges 54,54 for recesses 51,51 with respect to the top wall 28 of the blade. As best shown in FIG. 9,9a, tapered surfaces 55 are formed in central portion 52 and slope from top wall 28 outwardly to the outer walls 56 defining the ledges 53,53. Likewise, tapered surfaces 57 are formed in central portion 52 and slope from top wall 28 outwardly to the outer walls 58 defining ledges 54.

Figure 4:
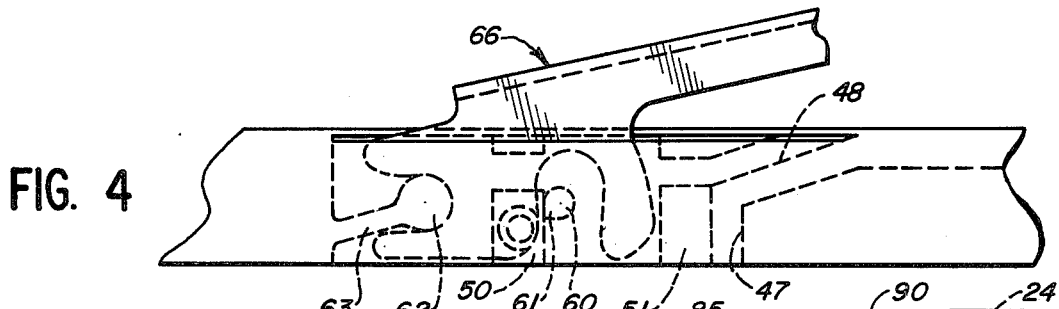
FIG. 4 is an elevational view of the connector portion of FIG. 3 with one type of windshield wiper arm end shown in phantom and connected therewith.

A pin 60 is molded (FIG. 8) between the side walls 30,32 to intersect and cross the slots 36,38 in about the midportion of the connector 25 and in close proximity to the outboard recesses 50,50. It will be noted in FIG. 4 that the pin 60 has a slight out of round protrusion 61 in the lower outboard portion of the pin for a purpose to become evident hereinafter. The pin 60 may be a separate pin which may be molded in place or may be inserted through aligned openings in the side walls 30,32 and affixed in place therein. A second, and larger diameter, pin 62 is longitudinally spaced outboard of the pin 60. As illustrated, pin 62 is molded between the side walls 30,32 and intersects and crosses both slots 36,38. A web 63 slopes longitudinally and downwardly from the pin 62 to a junction with the unslotted portion of the yoke 26. The vertical height of the web 63 is less than the diameter of the pin 62 and joins with the pin in the lower outboard portion of pin 62, as best seen in FIGS. 3,4. The pin 62 may be a separate pin molded in place or inserted in aligned openings in the side walls 30,32 and affixed therein. The pin 62, if a separate pin, will have an out of round protrusion, not shown, somewhat similar to the protrusion 61 on the pin 60.

Figure 12:
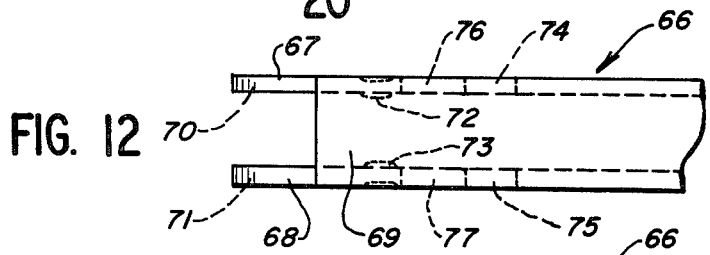
FIG. 12 is a plan view of a windshield wiper arm end of the type shown assembled with the connection in FIG. 4.
Figure 13:
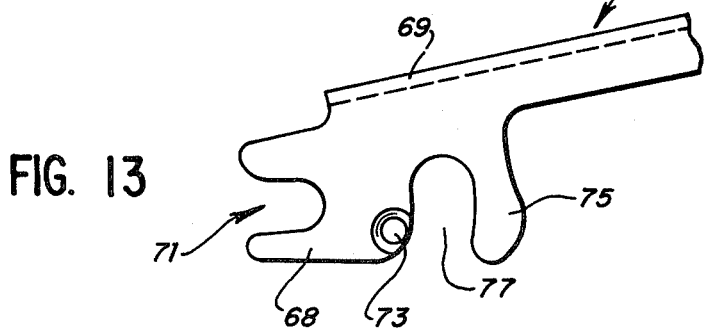
FIG. 13 is an elevational view of the windshield wiper arm end shown in FIG. 12.

Referring to FIGS. 12-15, inclusive, the male connector ends of two different windshield wiper arms 24 are illustrated. FIGS. 12 and 13 illustrate the male blade engaging connector 66, which is shown integrally formed on the end of the wiper arm 24. The connector 66 has first and second spaced apart tabs or ears 67,68 which are disposed at the end of the wiper arm and are parallel to each other and to the longitudinal axis of the arm. The tabs or ears 67,68 are joined to a transverse web 69 and are separated by a distance substantially equal to the width of the center portion 52 between the slots 36,38 of the wiper blade 22. Pin engaging slots 70,71 are formed in the forwardly facing edges of the tabs or ears 67,68, respectively. The pin slots 70,71 are aligned with each other and are dimensioned to fit over the outboard pin 62. Each of the tabs or ears 67,68 also has a boss 72,73, respectively, which are disposed near the lower rear corner of the tabs spaced from the slots 70,71. The bosses 72,73 are directed inwardly toward each other with the space between the bosses being less than the space between the tabs or ears 67,68. Lying in the same planes as the tabs 67,68 and spaced rearwardly of said tabs 67,68 are guide portions or lugs 74,75 which define downwardly open recesses 76,77 between the tabs 67,68 and guide portions 74,75.

The wiper arm 24 having the connector 66 is assembled with the blade 22 by holding the blade at right angles to the arm and by aligning the tabs 67,68 with the slots 36,38 in the blade. The pin slots 70,71 in the tabs 67,68 are aligned with and moved into contact with the enlarged outboard pin 62 whereupon the blade is rotated relative to the arm so as to move the guide portions 74,75 into the slots 36,38 with the recesses 76,77 straddling the inboard pin 60. The bosses 72,73 engage the tapered surfaces 55,55 and, as the blade is rotated relative to the arm, the tabs 67,68 are forced apart until the bosses 72,73 drop into the outboard recesses 50,50, whereupon the arm is assembled with the blade. In the assembled position, the rear edges of the tabs 67,68 are in close proximity to the pin 60 to prevent the tabs 67,68 from moving longitudinally of the blade an amount sufficient to disconnect the pin slots 70,71 from the pin 62.

Figure 14:
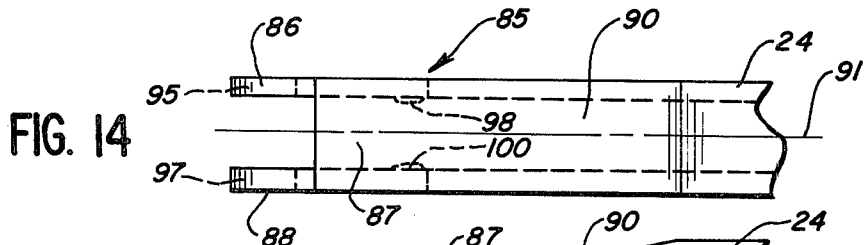
FIG. 14 is a plan view of a windshield wiper arm end of the type shown assembled with the connector in FIG. 5.
Figure 15:
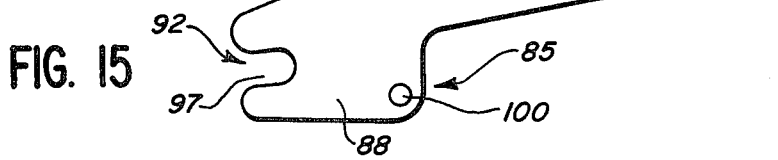
FIG. 15 is an elevational view of the windshield wiper arm end shown in FIG. 14.

Referring now to FIGS. 14 and 15, another embodiment of a male blade engaging connector 85 is shown integrally formed on the end of the wiper arm 24. The connector 85 has first and second spaced apart tabs or ears 86,88 which are disposed on the end of an angled portion 90 of the wiper arm 24 and are parallel to the longitudinal axis 91 of said angled portion 90. The first and second tabs 86,88 are parallel to each other, are transverse to web 87, and are separated by a distance substantially equal to the width of the center portion 52 between the slots 36,38 of the wiper blade 22, i.e. the distance from the inside of the tab 86 to the inside of the tab 88 is substantially equal to the distance between the inside of the slot 36 and the inside of the slot 38.

Referring specifically to FIG. 15, the first and second tabs 86,88 are generally identical in appearance and include pin-engaging recesses 92 in the form of pin slots 95,97 formed in the forwardly facing edges of the first and second tabs 86,88, respectively. The pin slots 95,97 are axially aligned with each other and are dimensioned to fit over the inboard pin 60.

Each of the tabs 86,88 also has a boss 98,100, respectively, which are disposed near the lower rear corner of the tabs, spaced from the pin slots 95,97. The bosses 98,100 are directed inwardly, i.e. the boss 98 extends inwardly toward the tab 88 and the boss 100 extends inwardly toward the tab 86 a small distance, with the space between the bosses being less than the space between the tabs 86,88.

The wiper blade 22 may be secured to the wiper arm 24 having the male connector 85 by inserting the first and second tabs 86,88 into the slots 36,38, respectively. Insertion of the tabs 86,88 is facilitated by the lead-in surfaces 46,48 which guide the pin slots 95,97 into general alignment with the inboard pin 60.

Insertion of the tabs 86,88 may be facilitated by rotating or tilting the blade 22 somewhat, i.e. rotating the blade 22 clockwise about the axis of the pin 60 such that the pin slots 95,97 are open directly to the pin 60.

The first and second tabs 86,88 are inserted into the slots 36,38 until the pin slots 95,97 are inserted their full extent over the pin 60. The wiper blade 22 is then rotated in a counterclockwise direction about the axis of pin 60 whereupon the bosses 98,100 engage with the tapered surfaces 57,57. A slight further pressure in the counterclockwise direction on the blade will ride the bosses 98,100 down the surfaces 57,57 to spread the tabs 86,88 until the bosses clear the ledges 53,53 and drop into the recesses 51,51, which is the position shown in phantom in FIG. 5. The thickness of the tabs 86,88 and the height of the bosses 98,100 are such that a slight interference fit will exist when the bosses 98,100 are passed over the central portion 52 between the slots 36,38 but that no effective interference will be present once the bosses 98,100 have passed into the recesses 51,51.

The absence of an interference fit between the bosses 72,73 or 98,100 and the walls of the recesses 50,50 or 51,51 allows the wiper blade 22 to have a degree of rotational freedom in the plane transverse to the axis of the pins 62 or 60 limited by the travel of the bosses 72,73 or 98,100 within the recesses 50,50 or 51,51. The interrelationship between the bosses 72,73 or 98,100 and the recesses 50,50 or 51,51 is to assure that the blade stays assembled with the arm during lifting of the blade from the windshield. Since, during use, the wiper arm 24 is spring biased against a windshield of a vehicle, the limited degree of freedom of movement between the arm and blade afforded by the recess and bosses is important to accommodate varying angles of mounting of the arm 24 relative to the windshield and to accommodate for various curvatures of the windshield being wiped.

Moreover, the spring biasing of the arm 24 against the windshield and the capturing of the pin 60 by the pin slots 95,97 insures that the wiper blade 22 will remain securely fastened to the arm 24 under all conditions. The vertical walls 47 in the slots 36,38 prevent the tabs 86,88 on the arm end from moving longitudinally of the blade an amount sufficient to disconnect the pin slots 95,97 from the pin 60.

The web 63 connected to pin 62 and the protrusion 61 on pin 60 serve to limit the rotation of the arm relative to the blade in one direction. That is, the arm will not be permitted to pivot relative to the blade closer than a few degrees, thereby preventing interference between the arm and blade in the plane transverse to the windshield.

Figure 10:
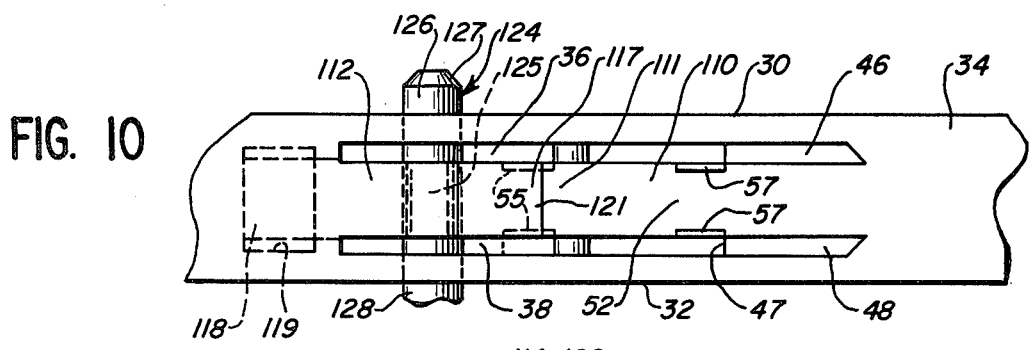
FIG. 10 is a plan view of a modified form of connector with parts shown in phantom and with a connector pin assembled therewith.
Figure 11:
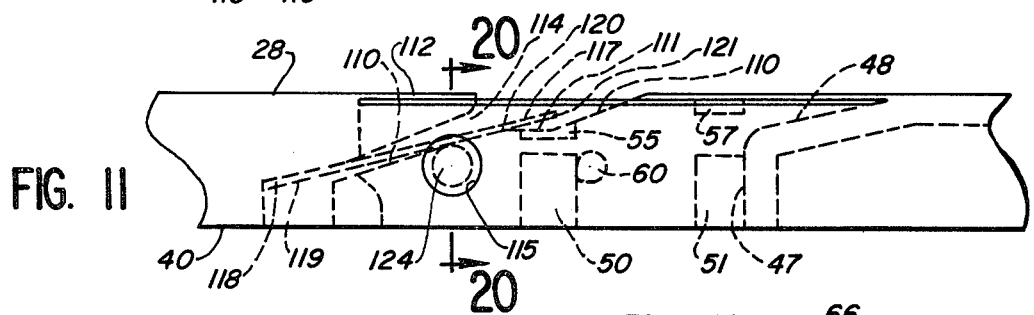
FIG. 11 is an elevational view of the modified connector shown in FIG. 10 with parts shown in phantom.

Referring to a modified form of the invention as shown in FIGS. 10,11, the right hand portion of the female connector 34 is substantially the same as the right hand portion of the invention shown in FIGS. 2-5, and includes the slots 36,38, the pin 60 with the protruding ledge 61, the longitudinally spaced pairs of recesses 50,50 and 51,51 in the central portion 52, the sloped lead in surfaces 46,48, the longitudinally spaced pairs of tapered surfaces 55,55,57,57 leading to the recesses 50,50 and 51,51, respectively, and the vertical walls 47 extending from the tapered lead-in surfaces 46,48. The central portion 52 has a sloped surface 110 which slopes in the same direction as the lead-in surfaces 46,48. The sloped surface 110 has a center surface 111 which is generally parallel to the top wall 28 of the primary yoke 26.

A lip 112 forming a part of the top wall 28 overhangs an outboard portion of the sloped surface 110. The lip 112 is disposed between the slots 36,38 and is spaced from the outboard portion of the sloped surface 110 to form a sloping slot 114 between the lip 112 and the sloped surface 110 for reasons which will become evident in a later portion of the specification.

A bore 115 extends through the yoke 26 from the side wall 30, through the center portion 52 to the side wall 32. The bore 115 is generally cylindrical in shape and resides principally beneath the lip 112 generally midway between the top wall 28 and the bottom wall 40 of the yoke 26. The bore 115 intersects the sloped surface 110 of the center portion 52 so that the bore 115 in the center portion 52 overlaps into the sloping slot 114.

A leaf spring 117 is anchored at one end portion 118 in a spring recess 119 in the yoke and extends through the sloping slot 114 between the lip 112 and the sloped surface 110 and terminates at a point above the center surface 111 of the central portion 52. The leaf spring 117, in its initial state, intersects the bore 115 along a chord of the bore and rests against a spring abutment 120 formed at the intersection of the center surface 111 and the sloped surface 110.

The leaf spring 117 may be made of spring steel, or any other sufficiently resilient material. The leaf spring 117 may be secured within the spring recess 119 by suitable fastening means, or by making the end portion 118 of the spring 117 slightly wider than the recess 119 and forcing the end portion 118 therein, thereby providing an interference fit between the parts. The force of the spring 117 is toward the center of the bore 115 so as to bear on the abutment surface 120 until forced upwardly therefrom. The spring 117 has a width in the vicinity of the bore 115 that equals the width of the center portion 52 of the connector so as not to overlap sidewise into the slots 36,38. The spring 117 has a free end 121 overhanging the surface 111, which end can be engaged and lifted to remove the spring 117 from overlapping the bore 115.

Referring to FIGS. 10 and 20, there is illustrated a side pin 124 which includes a reduced diameter central section 125 disposed between a first end portion 126 having a taper 127 and a second end portion 128 which may be fixed in an arm end 129. The first and second end portions 126,128 are of equal diameter and are sized to fit within the bore 115 in sides 30,32 such that when the pin 124 is in the bore 115, the spring 117 will seat in the reduced diameter section 125 to keep the pin 124 assembled with the connector. The pin 124 may be assembled with the blade by inserting end portion 126 in the bore 115 and pressing the tapered portion 127 against the spring 117 until the spring raises to permit the portion 126 to pass. When the spring lines up with the reduced diameter portion 125, the pin becomes locked to the blade. The pin 124 may be released from the yoke by lifting the free end portion 121 of the spring 117 until the enlarged end portion 126 of the pin can pass under the spring 117 to disconnect the pin 124 (and arm 129) from the blade. Any one of the many well known pins 130,131, such as shown in FIGS. 21, 22 and 23, respectively, may be assembled and disassembled with the blade of FIGS. 10,11 in the same manner described above.

Referring to FIGS. 16,17, another modified form of the female portion 34 of the connector of the invention is shown and entails primarily only the right hand portion of FIGS. 2-5 and FIGS. 10,11. Namely, the primary yoke 26 has spaced apart vertically disposed slots 36 and 38 separated by central portion 52. Lead-in sloped surfaces 46,48 merge into vertical walls 47 defining one end of the slots 36,38. Crosspin 60 with out of round protrusion 61 may be molded in transverse relationship to the slots 36,38 or may be separately molded in place or affixed in place after molding of the yoke. A vertical wall 59, spaced from wall 47 defines the outboard limit of the slots 36,38. Tapered surfaces 57,57 are formed into the top edges of the central portion 52 and slope outwardly as they progress from the top wall 28 of the central portion. Recesses 51,51 are formed in the central portion 52 in vertical alignment with the tapered surface 57,57, but spaced downwardly from the termination of the surfaces 57,57. The female portion 34 of the connector is adapted to receive only the type of arm end male portion 85, as shown and described with respect to FIGS. 14 and 15.

Referring to FIGS. 18 and 19, there is illustrated a wiper arm 140 and an adaptor 142 such that the wiper arm 140, which has a straight end 144, is attached to the adaptor 142 and the adaptor 142 has a male portion 85 for attachment to the female portion 34 of the connector 25 on the blade 22.

The adaptor 142 has an arm engaging portion 145 which is sleeve-shaped and consists of a top portion 146 and side portions 147 and 148 which surround the end 144 of the wiper arm.

Two pairs of tangs 149,150 depend downwardly from the side portions 147,148 and are turned inwardly beneath the end 144 of the wiper arm 140 to secure the wiper blade adaptor 142 to the arm 140.

A depressed portion 152 is disposed in the top 146 of the adaptor 142 and extends into a recess or dimple 153 disposed in the top of the wiper arm end 144. A pair of tangs 154,155 are disposed at the open end of the adaptor 142 and bear against the top of the wiper arm 140 when the adaptor 142 is assembled thereon.

The depressed portion 152 and the tangs 149,150 provide for an interference fit between the adaptor 142 and the arm 140 such that the two parts are securely fastened together. The arm end 140 may be removed from the adaptor 102 by applying axial force to pull the arm from the adaptor.

The blade engaging portion 85 of the adaptor 142 is identical to the blade engaging portion 85 illustrated and described in FIGS. 14 and 15.

The adaptor 142 is secured to the wiper blade 22 in the same fashion as was described with respect to FIGS. 14 and 15.

It should be noted that the construction of the primary yoke 26 of the wiper blade 22 of FIGS. 10 and 11 permits the attachment thereof to a wiper arm such as that shown in FIGS. 12,13 and 14,15, or to a straight end wiper arm 140 by means of the adaptor 142 illustrated in FIGS. 18 and 19 or to a conventional pin-type wiper arm 129 (shown in FIG. 20) by inserting the pin 124 on the pin-type arm in the bore 115. In the case of the pin-type arm, the spring 117 retains the arm on the blade by engaging in the reduced diameter portion 125 of the pin.

It should also be noted that the pin 124 may be omitted and a permanent, nonremovable pin 62 could be formed integrally with the primary yoke 26 of the wiper blade 22 as shown in FIGS. 2–5. However, the type of wiper blade of FIGS. 2–5 could not be secured to a conventional pin-type arm owing to the absence of a removable pin.

FIG. 20, as described above, shows the wiper arm 129 having a fixed side pin 124 which side pin 124 has a reduced diameter portion 125 in which is seated the leaf spring 117 when the pin 124 is assembled with the connector of the blade.

FIG. 21 shows a double ended pin 130 which has identical enlarged outer end portions 132, reduced diameter intermediate portions 133 and an enlarged mid portion 134. The pin 130 can be assembled with the connector of FIGS. 10,11 as described above. The extended end portion 132 can be engaged in the well known spring clip connector (not shown) on a wiper arm end.

FIGS. 22 and 23 shows the pin 131 having slightly elongated end portions 135 and a reduced diameter portions 136. The end portions 135 extend outwardly beyond the side walls 30,32 of the yoke. In FIG. 22 a male connector 66 of the type shown in FIGS. 12,13 is connected therewith in the slots 36,38 in the yoke 26. In FIG. 23 a wiper arm end 138 having aligned apertures 137 is assembled with the yoke 26 by dropping the arm end over the connector and inserting the pin 131 through the apertures 137 in the arm end 138 and through the bore 115 in the yoke whereupon the spring 117 can seat in the reduced diameter portion 136 of the pin. The arm end is thereby secured to the yoke for pivotal movement about the axis of the pin 131.

Figure 24:
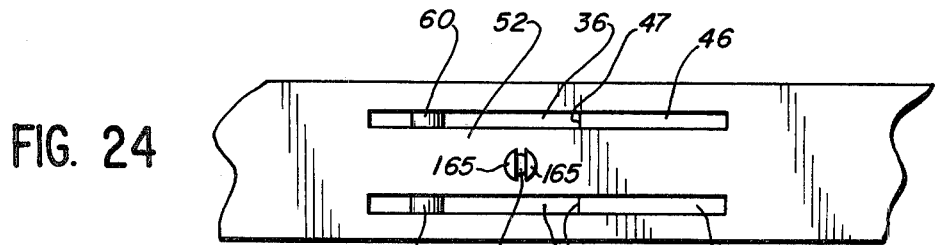
FIG. 24 is a plan view of another modified form of connector.
Figures 25, 26:
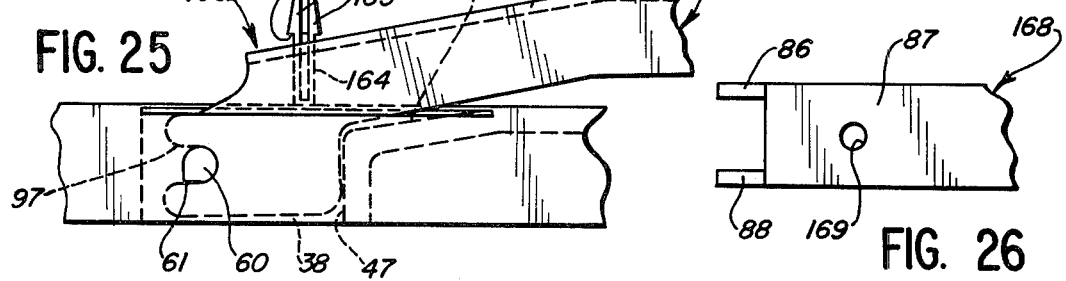
FIG. 25 is an elevational view of the connector of FIG. 24 with a modified arm end connected therewith.
FIG. 26 is a plan view of the arm end of FIG. 25.
Figure 27:
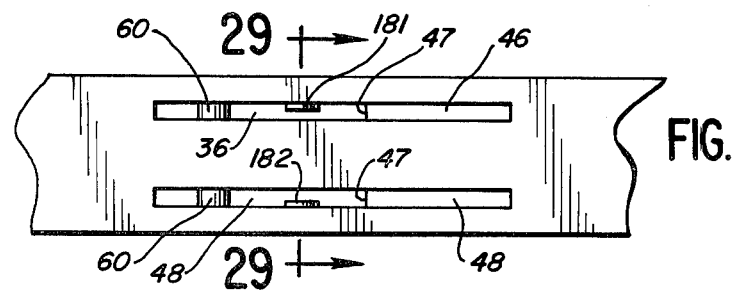
FIG. 27 is a plan view of still another modified form of connector.
Figures 28, 29, 30:
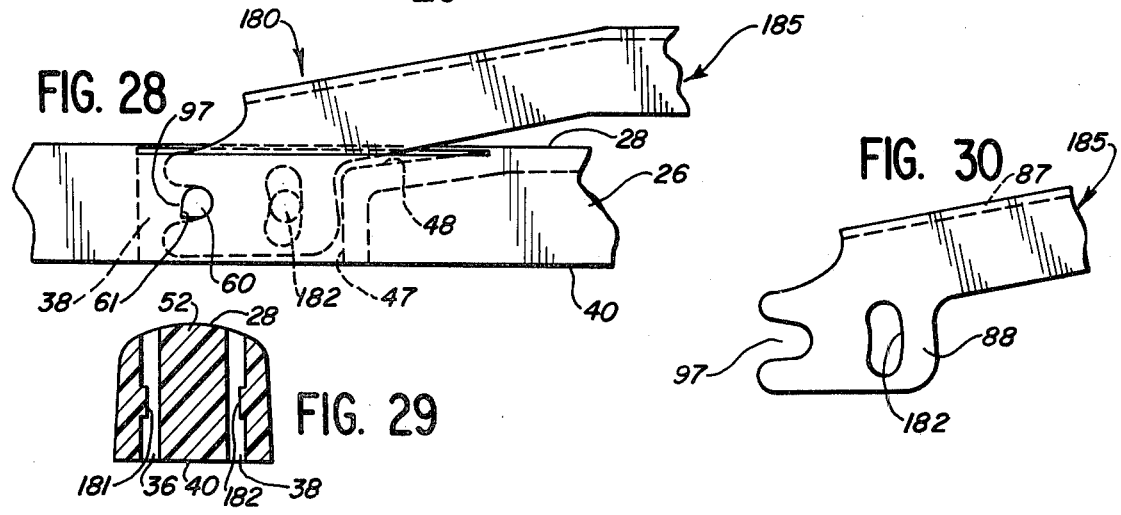
FIG. 28 is an elevational view of the connector of FIG. 27 showing in phantom a modified arm end connected therewith.
FIG. 29 is a cross-sectional view taken along the line 29—29 of FIG. 27.
FIG. 30 is an elevational view of the modified arm end of FIG. 28.

FIGS. 24,25 and 26 show a modified form of connector 160 wherein the female connector 162 has the same slots 36,38, lead-in sloped surfaces 46,48, vertical walls 47 and crosspin 60 with the protrusion 61. A different structure is shown for retaining the blade 20 on the arm 24 and includes an upwardly extending split shaft 164 affixed to the central portion 52 and has barbs 165 on each side of the shaft. The barbs 165 form abutments 166 facing the central portion 52 of the blade. The abutments 166 are spaced from the blade a predetermined mount. The arm end 168 has the same spaced apart tabs 86,88 with the forwardly facing pin slots 95,97 as the arm end 85 shown in FIGS. 14,15, however, the bosses 100 are eliminated. An aperture 169 is formed through the web 87 and is of a size to permit the split shaft 164 and barbs 165 to pass through with the barbs 165 preventing the arm end 168 from being removed from the barbs 165 without squeezing the barbs 165 together.

The arm end 168 is assembled with the blade by aligning the tabs 86,88 in the slots 36,38 with pin slots 95,97 on the arm aligned with the pin 60. The end of the split shaft 164 is aligned with the aperture 169 in the arm end whereupon pivoting the arm end about the pin 60 will pop the barbs 165 through the aperture 169 as the blade is assembled on the arm. The abutments 166 permit the arm end blade to pivot about the pin 60 without the blade becoming disconnected from the arm. The spacing between the abutments 165 and the blade is such that the blade and arm can move in the plane transverse to the windshield without interference during the normal wiping pattern of the blade.

FIGS. 27, 28, 29 and 30 show another connector 180 having a different structure for retaining the blade on the arm end 185. That is, the female connector in the blade has the same slots 36,38, sloped lead-in slots 46,48, vertical wall 47 and crosspin 60 with the protrusion 61. A pair of inwardly extending dimples 181,182 extend into the slots 36,38 and are located about midway between the top wall 28 and bottom wall 40 of the yoke 26. The arm end 185 has parallel tabs 86,88, pin slots 95,97 and the transverse web 87 and includes arcuate slots 186 in each tab 86,88. The arcuate slots 186 are aligned with each other and have a center at the axis of the pin 60 when the arm 185 is assembled with the blade. The tabs 86,88 are aligned with the slots 36,38 with the pin slots 95,97 aligned with the pin 60. When the bases of the slots 95,97 engage the pin, the blade is pivoted relative to the arm until the bottom edges of the tabs 86,88 engage with the dimples 181,182. A small pressure will pop the tabs over the dimples 181,182 until the arcuate slots 186 align with an encircle the dimples 181,182. The blade can now pivot freely relative to the arm end throughout the range of movement required between the arm and blade while at the same time, when the arm and blade are lifted from the windshield, the interaction between the dimples 181,182 and the arcuate slot 186 will prevent the blade from becoming disconnected from the arm end.

In each of the embodiments described above, the primary yoke of the wiper blade may be made of suitable material such as plastic and the adaptor 142, the arm 24 and the arm ends 66,85,138,168,185 are preferably made of a suitable metal.

It should be noted that due to the spacing between the tabs 86,88 and 67,68 (in the direction of movement of the arm and blade when used on a windshield) and due to the seating of the tabs 86,88 and 67,68, in the spaced apart slots 36,38, which slots have side walls juxtaposed in close relationship to the tabs 86,88 and 67,68, the blade is restrained quite effectively from rolling over about the longitudinal axis of the arm. In addition, the connection between the arm and blade is protected from the weather and, in its broadest application, does not use any moving parts such as springs or the like to hold the arm end to the blade.

We claim:

1. An apparatus for connecting a wiper arm to a wiper blade, said blade having a pair of side walls and a top wall, comprising:
    first and second parallel slots separated by a center portion having a predetermined width and extending through the wiper blade, the center portion being integral with the remainder of the wiper blade;
    at least one means carried by the blade for retaining the blade on the arm;
    a pin extending between the side walls of the wiper blade and traversing both of the slots;
    first and second parallel tabs disposed on the wiper arm and separated by a predetermined distance equal to the width of the center portion, each of said tabs having a pin engaging means disposed at one end thereof; and
    means on the wiper arm for coacting with said means on the blade for retaining the blade on the arm, whereby the first and second tabs extend into the first and second parallel slots respectively with the pin engaged by both of the pin engaging means and the means on the blade engaging with the means on the arm for retaining the blade on the arm.

2. The apparatus of claim 1, wherein each of the pin engaging means includes a pin slot open at the forward end of the tabs.

3. The apparatus of claim 1, wherein the means on the arm is a boss disposed adjacent the other end of the tab opposite the pin engaging means and wherein the means on the blade is a recess which is sufficiently large to allow the wiper blade to freely rotate within limits with respect to the wiper arm.

4. The apparatus as claimed in claim 1 wherein the means on the arm is an aperture disposed in one tab adjacent the other end of the tab opposite the pin engaging means and wherein the means on the blade is a dimple in at least one slot projecting transverse to one wall of the slot whereby when the arm is assembled with the blade, the aperture receives the dimple for movement therein during relative movement of the arm and blade.

5. The apparatus as claimed in claim 4 wherein an aperture is formed in each tab and a dimple is disposed in each slot.

6. The apparatus as claimed in claim 5 wherein the apertures are arcuate in shape with the center of the arc at the axis of the pin.

7. The apparatus as claimed in claim 1 wherein the means on the arm is an aperture disposed in a web between said tabs and wherein the means on the blade is an upstanding barbed shaft carried by the center portion of the blade whereby the barbed shaft passes through the aperture in the arm to retain the blade on the arm.

8. An apparatus for connecting a wiper arm to a wiper blade, said blade having a pair of side walls and a top wall, comprising:
    first and second parallel slots separated by a center portion having a predetermined width and extending through the wiper blade, the center portion being integral with the remainder of the wiper blade;
    at least one means carried by the blade for retaining the blade on the arm;
    a pin extending between the side walls of the wiper blade and traversing both of the slots;
    first and second parallel tabs disposed on the wiper arm and separated by a predetermined distance equal to the width of the center portion, each of said tabs having a pin engaging means disposed at one end thereof; and
    means on at least one of said tabs for coacting with said means on the blade for retaining the blade on the arm, whereby the first and second tabs extend into the first and second parallel slots respectively with the pin engaged by both of the pin engaging means and the means on the blade engaging with the means on the arm for retaining the blade on the arm.

9. The apparatus of claim 8, wherein each of the pin engaging means includes a pin slot open at the forward end of the tabs.

10. The apparatus of claim 8, wherein the means on the arm is a boss disposed adjacent the other end of the tab opposite the pin engaging means and wherein the means on the blade is a recess which is sufficiently large to allow the wiper blade to freely rotate within limits with respect to the wiper arm.

11. The apparatus as claimed in claim 8 wherein the means on the arm is an aperture disposed in one tab adjacent the other end of the tab opposite the pin engaging means and wherein the means on the blade is a dimple in at least one slot projecting transverse to one wall of the slot whereby when the arm is assembled with the blade, the aperture receives the dimple for movement therein during relative movement of the arm and blade.

12. The apparatus as claimed in claim 11 wherein an aperture is formed in each tab and a dimple is disposed in each slot.

13. The apparatus as claimed in claim 12 wherein the apertures are arcuate in shape with the center of the arc at the axis of the pin.

14. The apparatus of claim 1, further including first and second tapered slots disposed adjacent said first and second parallel slots including first and second lead-in surfaces for facilitating insertion of the tabs into the first and second parallel slots.

15. The apparatus of claim 1, further including an adaptor having an arm engaging portion secured to an end of the wiper arm and a blade engaging portion having said first and second tabs mounted on the end thereof.

16. The apparatus of claim 15, wherein the arm engaging portion is sleeve-shaped and includes a top portion and side portions which surround the end of the arm and tangs which extend beneath the arm.

17. An apparatus for selectively connecting one of two wiper arms to a wiper blade, said blade having a pair side walls and a top wall, comprising:
first and second parallel slots separated by a center portion and extending through said top wall of the wiper blade;
a first pin extending between the side walls of the wiper blade and transversing both of the slots, said first pin being spaced outboard a fixed distance from a vertical wall in at least one of said slots;
a second pin extending between the side walls of the wiper blade and traversing both of the slots, said second pin being spaced outboard of said first pin;
at least two recesses formed into said central portion, one of said recesses being located between said first and second pins, and the other of said recesses being located between said first pin and said vertical wall;
first and second parallel tabs disposed on said wiper arms, said tabs being separated by a distance equal to the width of the center portion between the slots, each of said tabs including pin engaging means disposed at one end thereof, the first and second tabs extending into the first and second parallel slots respectively with the pin engaging means engaging either the first or second of said pins and being trapped against movement longitudinally relative to said blade either by said vertical wall in said slot or by said first pin, at least one tab on each arm having a boss projecting out of the plane of the tab, said boss engaging in one or the other of said recesses with the relative size of said boss and recess being sufficiently large to allow the wiper blade and wiper arm to freely rotate relative to each other within predetermined limits.

18. The apparatus as claimed in claim 17 wherein each pin engaging means includes a pin slot open at the forward end of the tabs.

19. The apparatus of claim 17, wherein the second pin resides within a pin bore, and wherein said second pin is removable therefrom.

20. The apparatus of claim 19, wherein the pin is restrained within the pin bore by a leaf spring.

21. The apparatus of claim 20, wherein said leaf spring is seated in said center portion and overlaps said bore and wherein said second pin has a reduced diameter portion in which said leaf spring rests when said second pin is in said bore.

22. The apparatus as claimed in claim 20 wherein said leaf spring has one end exposed above a portion of said center portion whereby lifting said leaf spring releases said pin from said bore.

23. The apparatus as claimed in claim 20 wherein said second pin is a side pin carried by a wiper arm, said side pin being held seated in said bore by said leaf spring.

24. The apparatus as claimed in claim 20 wherein said second pin is a double ended pin having a reduced diameter portion at each end thereof, one end of said double ended pin being held seated in said bore by said leaf spring.

25. An apparatus for connecting a wiper arm to a wiper blade, said blade having a pair of side walls and a top wall, comprising:
first and second parallel slots separated by a center portion and extending through said top wall of the wiper blade;
first and second recesses extending into the center portion adjacent the first and second slots, respectively;
a first pin extending between the side walls of the wiper blade and traversing both of the slots outboard of said first and second recesses;
a second pin extending between the side walls outboard of said first pin;
third and fourth recesses extending into the center portion adjacent the first and second slots and being disposed outboard of the first pin;
first and second parallel tabs disposed on one style of wiper arm, each of said tabs including a pin slot open at one end of the tab and an inwardly extending boss disposed adjacent the other end of the tab, the first and second tabs extending into the first and second parallel slots, respectively, wherein the first pin is engaged by the pin slots and the bosses reside within the first and second recesses with the first and second recesses being sufficiently large to allow the wiper blade to freely rotate about the axis of the pin relative to the arm within predetermined limits; and
first and second parallel tabs disposed on a second style of wiper arm, each of said tabs include a pin slot open at one end of the tab and an inwardly extending boss, first and second flanges lying, respectively, in the planes of the first and second tabs and being spaced inboard of said tabs, the first and second tabs of said second arm extend into said slots and engage with said second pin, the first and second flanges extend into the slots between the first and second pins and the bosses engage in said third and fourth recesses with the third and fourth recesses being large enough to allow the blade to rotate relative to the arm a predetermined amount.

26. The apparatus of claim 25, further including an adaptor having an arm engaging portion secured to an end of the wiper arm and a blade engaging portion having said first and second tabs mounted on the end thereof.

27. The apparatus of claim 26, wherein the arm engaging portion is sleeve-shaped and includes a top portion and side portions which surround the end of the arm and tangs which extend beneath the arm.

28. An apparatus for connecting a wiper arm to a wiper blade, said blade having a pair of side walls and a top wall, comprising:
   first and second parallel slots separated by a center portion having a predetermined width and extending through said top wall of the wiper blade;
   a first pin extending between the side walls of the wiper blade and traversing both of the slots, said pin being spaced a fixed distance from a vertical wall in at least one of said slots; a second pin extending between the side walls of the wiper blade and traversing both of the slots, said second pin being spaced outboard of said first pin, and
   first and second parallel tabs disposed on the wiper arm by a width equal to the width of the center portion, each of said tabs including pin engaging means disposed at one end thereof, the first and second tabs extending into the first and second parallel slots respectively with the pin engaging means engaging either the first or second pin and being trapped against movement longitudinally relative to said blade either by said vertical wall in said slot or by the other of said first or second pin.

29. The apparatus of claim 28, wherein each of the pin engaging means includes a pin slot open at the one end of the tabs.

30. The apparatus of claim 28, wherein at least one tab has a boss projecting out of the plane of the tab, and wherein said wiper blade has at least one recess disposed adjacent one of said slots, said recess receives said boss and is sufficiently large to allow the wiper blade and wiper arm to freely rotate relative to each other within predetermined limits.

* * * * *